United States Patent

Setiabudi et al.

[11] Patent Number: 5,840,238
[45] Date of Patent: Nov. 24, 1998

[54] PROCESS FOR THE MANUFACTURE OF FIBRE-REINFORCED COMPOSITES

[75] Inventors: Frans Setiabudi, Eschbach; Thomas Kainmüller, Weil am Rhein, both of Germany

[73] Assignee: Ciba Specialty Chemicals Corporation, Tarrytown, N.Y.

[21] Appl. No.: 856,620

[22] Filed: May 13, 1997

[30] Foreign Application Priority Data

May 14, 1996 [CH] Switzerland .............................. 1227/96

[51] Int. Cl.$^6$ ...................................................... B28B 7/38
[52] U.S. Cl. .................... 264/331.17; 264/338; 526/172; 526/183
[58] Field of Search .............................. 526/43, 171, 172, 526/283; 264/171.24, 257, 331.13, 331.15, 331.17, 338; 428/267, 273, 272, 290, 441, 521

[56] References Cited

U.S. PATENT DOCUMENTS

| | | | |
|---|---|---|---|
| 4,883,851 | 11/1989 | Grubbs et al. ........................... | 526/172 |
| 5,008,065 | 4/1991 | Okumura et al. ................... | 264/331.17 |
| 5,096,644 | 3/1992 | End et al. ................................ | 526/283 |
| 5,342,909 | 8/1994 | Grubbs et al. ........................... | 526/283 |
| 5,369,196 | 11/1994 | Matsumoto et al. ..................... | 526/283 |
| 5,491,206 | 2/1996 | Wensley et al. ......................... | 526/172 |

FOREIGN PATENT DOCUMENTS

| | | |
|---|---|---|
| 0424833 | 5/1991 | European Pat. Off. . |
| 0534482 | 3/1993 | European Pat. Off. . |
| 9320111 | 10/1993 | WIPO . |
| 9616100 | 5/1996 | WIPO . |
| 9620235 | 7/1996 | WIPO . |

*Primary Examiner*—Veronica P. Hoke
*Attorney, Agent, or Firm*—David R. Crichton

[57] ABSTRACT

Fiber-reinforced composites are made from introducing a fabric into the lower part of an open two-part mold, closing the mold and injecting into the mold under pressure and curing a reactive resin mixture comprising (a) a strained cycloolefin and
(b) a ruthenium-containing catalyst.

5 Claims, No Drawings

PROCESS FOR THE MANUFACTURE OF FIBRE-REINFORCED COMPOSITES

The present invention relates to a process for the production of fibre-reinforced composites, the composites produced by this process and the use of these composites in car, aircraft or sports equipment construction.

Cycloolefins which can be polymerized by ring-opening metathesis polymerization (ROMP) have been said to be suitable as impregnating resins for the production of fibre-reinforced composites on the basis of their profile of properties. EP-A-424 833 describes a process for coating or impregnating substrates with polycycloolefins by means of the RIM process (reaction injection moulding). In this process, a two-component system of a catalyst and a co-catalyst is used for the ring-opening metathesis polymerization. The fabric is first coated with the ROMP catalyst and introduced into a mould. The cycloolefin is then mixed with the cocatalyst and this mixture is let into the heated mould. The cyloolefin then polymerizes in a very short time in an exothermic reaction.

However, this process is relatively expensive because of the separate coating of the fabric with the catalyst. The use of alkylaluminium chlorides as the cocatalyst furthermore requires the exclusion of moisture.

It has now been found that a mixture of a cycloolefin and specific ruthenium catalysts is suitable for the impregnation of fibres in the RIM process.

The present invention relates to a process for the production of fibre-reinforced composites, which comprises introducing a fabric into the lower part of an open two-part mould, closing the mould and injecting into the mould under pressure and curing a reactive resin mixture comprising
(a) a strained cycloolefin and
(b) a compound of the formula I or II

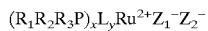  (I),

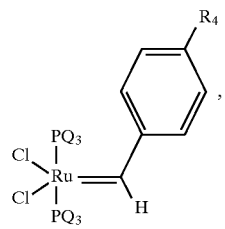  (II)

in which $R_1$, $R_2$ and $R_3$ independently of one another are phenyl, tolyl or cyclohexyl, L is benzene which is unsubstituted or substituted by 1 to 3 $C_1$–$C_4$alkyl, thiophene, benzonitrile, acetonitrile, nitrogen ($N_2$), an unsubstituted or partly or completely fluorinated $C_1$–$C_4$alcohol, CO, $H_2O$ or $NH_3$, $Z_1^-$ and $Z_2^-$ independently of one another are $H^-$, $Cl^-$, $Br^-$, $BF_4^-$, $PF_6^-$, $SbF_6^-$, $AsF_6^-$, $CF_3SO_3^-$, $C_6H_5$—$SO_3^-$, p-toluenesulfonate (tosylate), 3,5-dimethylphenylsulfonate, 2,4,6-trimethylphenylsulfonate, 4-trifluoromethylphenylsulfonate or cyclopentadienyl, x is a number from 1 to 3 and y is a number from 0 to 3, where $2 \leq x+y \leq 4$, Q is phenyl, cyclopentyl or cyclohexyl and $R_4$ is hydrogen, chlorine or tert-butyl.

Injection of a reactive resin into a mould is known to the expert by the terms RIM (reaction injection moulding) or S-RIM (structural reaction injection moulding) or also RTM (resin transfer moulding). In this procedure, the resin can be pumped with an increased pressure (advantageously up to about 10 bar) into the mould, which is under normal pressure. However, it is also possible to evacuate the mould and then to establish the connection to the resin reservoir which is under normal pressure or increased pressure via a valve. The mould can be filled both at room temperature and at higher temperatures (up to the curing temperature). However, for industrial use in particular, it is advantageous to carry out the impregnation of the fabric and the subsequent curing at the same temperature; i.e. the mould is preferably already heated to the curing temperature before the impregnation. When impregnation of the fabric is complete, the mould is heated, preferably to 40°–300° C., in particular 60°–200° C., until curing of the resin is complete.

All the customary fibres can be impregnated by the process according to the invention. Glass fibres, carbon fibres or aramid fibres (for example Kevlar®) are preferably used.

Strained cycloolefins in the context of the present invention are to be understood as meaning all cycloolefins, with the exception of cyclohexene and its derivatives, which cannot be polymerized by ring-opening metathesis. Examples of strained cycloolefins are described, inter alia, in WO 96/16100 and WO 96/20235.

A Diels-Alder adduct of cylcopentadiene is preferably employed as component (a), for example in a compound of the formula III

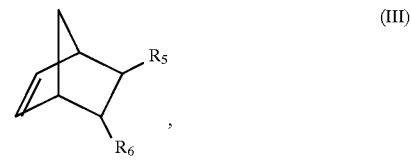  (III)

in which $R_5$ and $R_6$ independently of one another are hydrogen, $C_1$–$C_{12}$alkyl, phenyl, tolyl, cyclohexyl, cyclohexenyl, halogen, cyano, $C_1$–$C_{12}$hydroxyalkyl or $C_1$–$C_{12}$haloalkyl, or $R_5$ and $R_6$, together with the C atoms to which they are bonded, form a five- or six-membered ring.

Suitable Diels-Alder adducts are, for example, the following compounds:

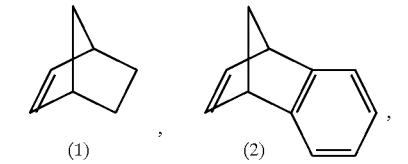

(1)          (2)

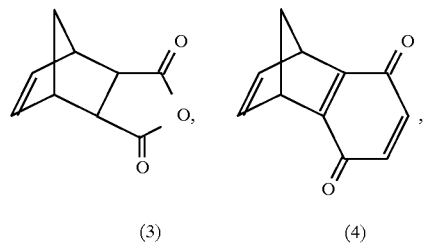

(3)          (4)

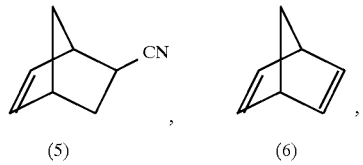

(5)          (6)

-continued

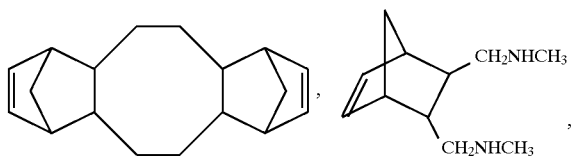

(7)  (8)

(9)  (10)

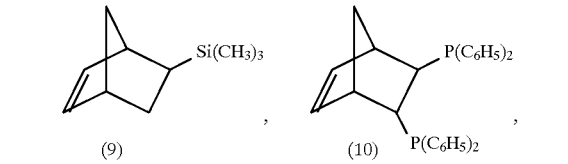

(11)  (11)

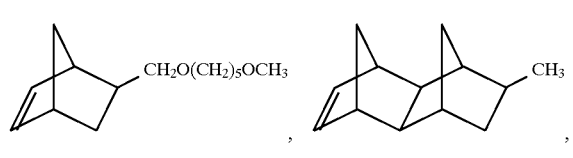

(12)

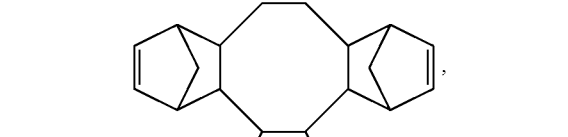

(13)  (14)

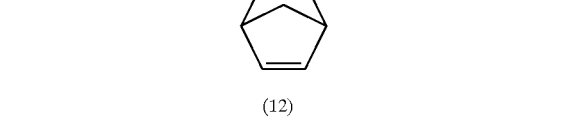

(15)

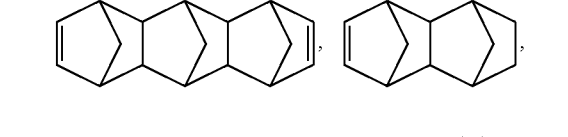

(16)  (17)

-continued

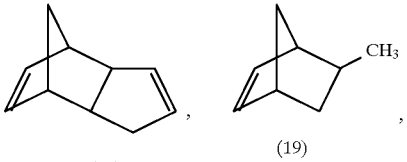

(18)  (19)

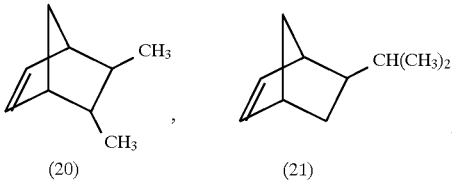

(20)  (21)

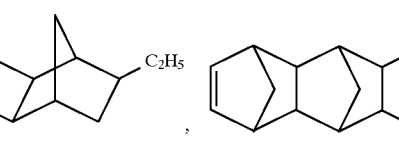

(22)  (23)

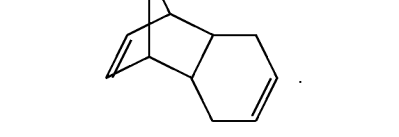

(24)

Preferred Diels-Alder adducts are tetracyclododecene (14), methyltetracyclododecene (11) and, in particular, dicyclopentadiene (18).

The ROMP catalysts to be used as component (b) are described in WO 96/16100, WO 96/20235 and WO 93/20111.

Particularly preferred ROMP catalysts are [(cyclohexyl)$_3$P]$_2$RuCl$_2$, [(C$_6$H$_5$)$_3$P]$_3$ RuCl$_2$, [(C$_6$H$_5$)$_3$P]$_3$ (CO)RuH$_2$, [(C$_6$H$_5$)$_3$P]$_3$ RuCl(cyclopentadienyl), [(cyclohexyl)$_3$P]$_2$(CH$_3$OH)Ru(tosylate)$_2$, [(o-tolyl)$_3$P]$_3$RuCl$_2$, [(CH$_3$)$_2$CH]$_3$P (p-cymene)RuCl$_2$ and, in particular, (cyclohexyl)$_3$P(p-cymene)RuCl$_2$.

The amounts of components (a) and (b) in the compositions according to the invention can vary within wide ranges.

The compositions according to the invention preferably comprise, based on the total composition, 90.0–99.999% by weight, in particular 98.0–99.99% by weight, of component (a) and 0.001–10.0% by weight, in particular 0.01–2.0% by weight, of component (b).

The desired viscosity of the curable mixture can be established by addition of thermoplastic materials. Examples of suitable thermoplastics are polystyrene, polynorbornene (for example Norsorex® NS from Nippon Zeon), hydrogenated polynorbornene derivatives (for example Zeonex® from Nippon Zeon), polycyclooctene (for example Vestenamer® from Hüls) and polybutadiene.

The curable mixtures can furthermore comprise tougheners, for example core/shell polymers or the elastomers known to the expert as rubber tougheners, or elastomer-comprising graft polymers.

Suitable tougheners are described, for example, in EP-A-449 776.

To improve the electrical properties (dielectric constant, loss factor), silanes, for example the compounds available from Osi Specialties under the name Silquest® silane, can be added to the curable mixtures. Suitable silanes are, for example, octyltriethoxysilane, methyltriethoxysilane, vinyltriethoxysilane, methyltrimethoxysilane, vinyltrimethoxysilane, γ-aminopropyltrimethoxysilane and γ-glycidyloxypropyltrimethoxysilane.

In addition to the abovementioned additives, the compositions according to the invention can comprise further customary additives, for example antioxidants, light stabilizers, plasticizers, dyes, fillers, pigments, thixotropic agents, defoamers, antistatics, lubricants and mould release auxiliaries.

The ROMP catalysts to be used as component (b) are insensitive to moisture. The process according to the invention therefore does not necessarily have to be carried out with exclusion of moisture. The separate coating of the fabric with the catalyst, described in EP-A-424 833, is also not necessary.

A very uniform impregnation is achieved with the process according to the invention. The desired latency of the reaction mixture can be adjusted by the choice of catalyst and amount thereof. A high latency means a high stability at the particular storage temperature, without the reactivity being substantially reduced at the desired curing temperature.

The fibre-reinforced composites produced by the process according to the invention are distinguished in particular by a high heat stability, high toughness and mechanical strength, and are particularly suitable for the production of tools or mouldings for car, aircraft or sports equipment construction.

The invention therefore also relates to the fibre-reinforced composites produced by the process according to the invention and to their use for the production of tools or moulds for car, aircraft or sports equipment construction.

EXAMPLE

Preparation of the Reactive Resin Mixture 1.5 g of Norsorex® NS (thermoplastic polynorbornene from Nippon Zeon) are dissolved in 97.4 g of dicyciopentadiene at 80° C. After cooling to 60° C., the mixture is degassed in vacuo (3 mbar) for 10 minutes. 0.5 g of vinyltrimethoxysilane (Silquest® A-171 from Osi Specialties) and 0.3 g of Byk 066 (defoamer from Byk Chemie) are then added. After cooling to room temperature, 0.3 g of (cyclohexyl)$_3$P(p-cymene)RuCl$_2$ is added. The mixture is heated to 60° C. and stirred at this temperature for about 20 minutes until the catalyst has dissolved completely. The mixture is then degassed once more in vacuo (3 mbar) for 10 minutes. After cooling to room temperature, the mixture is ready to use in the RTM process.

RTM Process

A two-part steel mould with an interior of dimensions 25 cm×25 cm×0.3 cm is used for the RTM process. The lower part of the mould has, on the side at the bottom, an opening of diameter 3 mm connected to the resin container by a channel. A valve is incorporated between the resin container and the mould. A second opening of diameter 3 mm in the middle of the upper part of the mould is connected to a vacuum pump.

Several layers of glass fibre fabric are cut and laid in the mould. The mould is evacuated to 10 mbar at room temperature. The reactive resin mixture is transferred into the mould by opening the valve. During this operation, the resin flows uniformly from the edge to the centre of the mould. The flow rate can be regulated by the valve setting or by the pressure level in the mould. To obtain good impregnation of the fabric, the filling time should be 1–3 minutes.

The mould is then heated to 95° C. After 4–5 hours, the initially cured material can be removed from the mould and after-cured in an oven.

What is claimed is:

1. A process for the production of a fibre-reinforced composite, which comprises introducing a fabric into the lower part of an open two-part mould, closing the mould and injecting into the mould under pressure and curing a reactive resin mixture comprising (a) a Diels-Alder adduct of cyclopentadiene and (b) a compound of the formula I $$(R_1R_2R_3P)_xL_yRu^{2+}Z_1^-Z_2^- \qquad (I),$$

in which $R_1$, $R_2$ and $R_3$ independently of one another are phenyl, tolyl or cyclohexyl, L is benzene which is unsubstituted or substituted by 1 to 3 $C_1$–$C_4$alkyl, thiophene, benzonitrile, acetonitrile, nitrogen ($N_2$), an unsubstituted or partly or completely fluorinated $C_1$–$C_4$alcohol, CO, $H_2O$ or $NH_3$, $Z_1^-$ and $Z_2^-$ independently of one another are H$^-$, Cl$^-$, Br$^-$, BF$_4^-$, PF$_6^-$, SbF$_6^-$, AsF$_6^-$, CF$_3$SO$_3^-$, C$_6$H$_5$—SO$_3^-$, p-toluenesulfonate (tosylate), 3,5-dimethylphenylsulfonate, 2,4,6-trimethylphenylsulfonate, 4-trifluoromethylphenylsulfonate or cyclopentadienyl, x is a number from 1 to 3 and y is a number from 0 to 3, where 2≦x+y≦4.

2. A process according to claim 1, wherein the fabric comprises glass fibres, carbon fibres or aramid fibres.

3. A process according to claim 1, wherein the reactive resin mixture comprises dicyclopentadiene as component (a).

4. A process according to claim 1, wherein the reactive resin mixture comprises (1-methyl-4-isopropylbenzene)RuCl$_2$P(cyclohexyl)$_3$ as component (b).

5. A fibre-reinforced composite obtainable by the process according to claim 1.

* * * * *